US010264101B2

(12) United States Patent
Blank (10) Patent No.: US 10,264,101 B2
(45) Date of Patent: Apr. 16, 2019

(54) APPLICATION DEPENDENCY MONITORING FOR CLOUD APPLICATIONS (71) Applicant: SAP SE, Walldorf (DE)

(72) Inventor: Guy Blank, Tel Aviv (IL)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 15/259,390

(22) Filed: Sep. 8, 2016

(65) Prior Publication Data
US 2018/0069948 A1 Mar. 8, 2018

(51) Int. Cl.
H04L 12/24 (2006.01)
H04L 12/26 (2006.01)
H04L 29/08 (2006.01)

(52) U.S. Cl.
CPC .......... *H04L 67/36* (2013.01); *H04L 41/5009* (2013.01); *H04L 41/5096* (2013.01); *H04L 43/50* (2013.01); *H04L 67/10* (2013.01)

(58) Field of Classification Search
CPC . H04L 41/5009; H04L 41/5096; H04L 43/50; H04L 67/10; H04L 67/36; H04L 63/20; H04L 63/10; H04L 12/24; H04L 12/26; H04L 29/08; G06F 8/60; G05B 2219/25107
See application file for complete search history.

(56) References Cited

U.S. PATENT DOCUMENTS

| | | | |
|---|---|---|---|
| 2009/0276771 A1* | 11/2009 | Nickolov | G06F 9/4856 717/177 |
| 2012/0042210 A1* | 2/2012 | Glaser | G06F 11/3684 714/38.1 |
| 2012/0233668 A1* | 9/2012 | Leafe | G06F 9/5022 726/4 |
| 2013/0268437 A1* | 10/2013 | Desai | G06Q 20/08 705/41 |
| 2014/0109115 A1* | 4/2014 | Low | G06F 9/541 719/328 |
| 2015/0082148 A1* | 3/2015 | Lai | G06F 17/214 715/235 |
| 2015/0120939 A1* | 4/2015 | Islam | H04L 47/70 709/226 |
| 2015/0163121 A1* | 6/2015 | Mahaffey | G06F 11/0766 707/687 |
| 2015/0261514 A1* | 9/2015 | Fu | G06F 9/45558 718/1 |

(Continued)

*Primary Examiner* — Sargon N Nano
(74) *Attorney, Agent, or Firm* — Mintz Levin Cohn Ferris Glovsky and Popeo PC (57) ABSTRACT Methods and apparatus, including computer program products, are provided for monitoring cloud applications. The method may include receiving an indication to monitor a cloud application; obtaining metadata regarding the cloud application, the metadata comprising at least one path to at least one dependent service; selecting, based on the obtained metadata, a plugin to enable creation of a test version of the cloud application; causing, based on the plugin and the obtained metadata, the creation of the test version to enable monitoring the at least one path to the at least one dependent service; and providing to a user interface an indication regarding a status of the monitored at least one path to the at least one dependent service. Related systems, methods, and articles of manufacture are also disclosed.

16 Claims, 3 Drawing Sheets (56) References Cited

U.S. PATENT DOCUMENTS

| | | | |
|---|---|---|---|
| 2015/0302398 A1* | 10/2015 | Desai | G06F 8/60 |
| | | | 705/41 |
| 2017/0249393 A1* | 8/2017 | Nair | G06F 17/30873 |
| 2017/0337227 A1* | 11/2017 | Abraham | G06F 3/0482 |

* cited by examiner

APPLICATION DEPENDENCY MONITORING FOR CLOUD APPLICATIONS

FIELD

The subject matter described herein generally relates to monitoring cloud-based applications.

BACKGROUND

A cloud application may have dependencies to other services including applications. For example, a user interface may be used to access, via the Internet, a cloud-based application. This cloud application may, as part of providing its service, have dependencies to other applications/services. In order to respond to a request from the user interface for example, the cloud application may need to access a service to obtain data, access another service or application to obtain user interface files, and so forth. Indeed, each function at the cloud application may have its own dependencies to other services/applications. As such, a cloud application can have dozens and dozens of dependencies to other services and/or applications.

SUMMARY

Methods and apparatus, including computer program products, are provided for monitoring cloud applications.

In some implementations, there may be provided a method. The method may include receiving an indication to monitor a cloud application; obtaining metadata regarding the cloud application, the metadata comprising at least one path to at least one dependent service; selecting, based on the obtained metadata, a plugin to enable creation of a test version of the cloud application; causing, based on the plugin and the obtained metadata, the creation of the test version to enable monitoring the at least one path to the at least one dependent service; and providing to a user interface an indication regarding a status of the monitored at least one path to the at least one dependent service.

In some example embodiments, one of more variations may be made as well as described in the detailed description below and/or as described in the following features. The indication to monitor may represent a request from a user interface to monitor the cloud application. The test version may be created in a sand box separate from the cloud application. The metadata may include configuration information representative of a state of the cloud application. An identity of the cloud application may be determining from the metadata. Based on the identity of the cloud application, a check may determine whether a predetermined plugin is mapped to the identity. When there is a mapping between the identity and the predetermined plugin, the predetermined plugin may be selected. When there is a no mapping between the identity and the predetermined plugin, a default plugin may be selected, and the default plugin may checks the at least on path. The plugin may be further configured to at least check a response message from the at least one dependent service to ensure that the response message includes a proper format and/or a proper content. The plugin may send a predetermined message to trigger the response message. The plugin may be selected from a plurality of plugins. The test version may be monitored, rather than the cloud application, to check the availability of the at least one dependent service. The selected plugin may be a generic plugin configured to monitor the at least one path to the at least one dependent service by at least sending at least one message to check the availability of the at least one path.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

A cloud application can have, as noted above, dozens and dozens of dependencies to other services and/or applications. But these dependent services/applications may not always be available. For example, a path from the cloud application to a dependent service/application may be down due to a lack of connectivity or the dependent service/application may not be available for other reasons (e.g., down for maintenance and/or the like). In this example however, the cloud application may not be aware of the lack of access to the dependent service/application, which can result in poor cloud application performance and/or poor user experience at the cloud application level.

In some example implementations, there may be provided a monitoring service configured to monitor a cloud application's dependent services and/or applications. The monitoring of the dependent applications/services may improve their availability when needed by the cloud application (which may also improve overall cloud application performance and/or poor user experience at the cloud application level).

Figure 1:
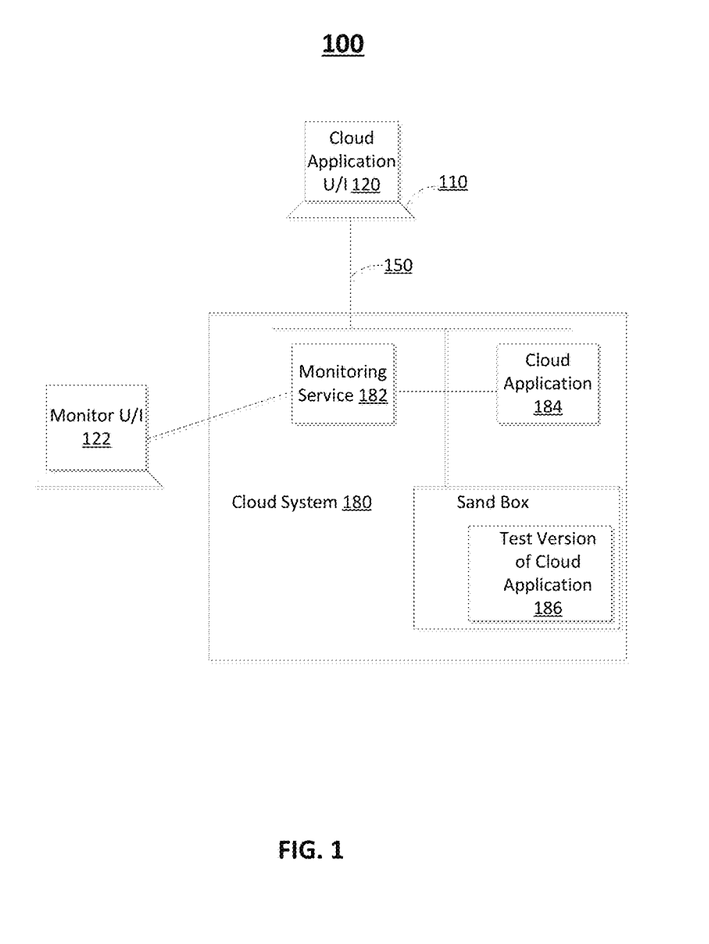
FIG. 1 illustrates a block diagram of a cloud application monitoring service, in accordance with some example implementations.

FIG. 1 depicts an example system 100 for monitoring cloud-based applications, in accordance with some example implementations.

The system 100 may include a cloud-based system 180. The cloud-based system 180 may include at least one processor and at least one memory including code or instructions that can cause at least a cloud-based application 184 to be provided. The cloud application 184 may be implemented as an application, a cloud-based application, a service, a cloud-based service, and/or any other type of program.

The cloud application 184 may be accessed via the Internet 150 by one or more user equipment 110 including an interface 120, such as a browser, a client application, a user interface, and/or any other interface that enables interaction with and/or access to cloud application 184. The user equipment 110 may be implemented as at least one processor and at least one memory including code or instructions; examples of user equipment include a computer, a smart phone, a tablet computer, a wireless Internet of Things (IoT) sensor or device, and/or the like.

The cloud system 180 may include a monitoring service 182 for monitoring one or more applications at the cloud system 180, in accordance with some example implementations.

In the example of FIG. 1, the monitoring service 182 may be configured to at least monitor cloud application 184. The monitoring service 182 may also expose data to other programs including a monitoring user interface 122. The monitoring user interface 122 may present information regarding the cloud application 184 being monitored and, in particular, the status of any of the dependent applications and/or services (e.g., the applications and/or services that application 184 may call or access) of cloud application 184. For example, if cloud service application 184 has 8 dependent applications and/or services it accesses or calls, the monitoring user interface 122 may present the status, such as whether the cloud application is available (e.g., whether the dependent application/service can be accessed, whether the dependent application/service responds to a ping, whether the dependent application/service responds with the correct response to a request from the application, and/or the like).

In some example implementations, the monitoring service 182 may access and/or obtain metadata regarding the configuration of cloud application 184, which is the actual application for which the dependency monitoring is sought. Rather than monitor the operational cloud application 184 directly, the monitoring service 182 creates, based on the metadata for cloud application 184, another application 186 which represents application 186. For example, the monitoring service 182 may create a duplicate application instance 186 representative of cloud application 184. The duplicate application instance 186 may be implemented as a sand boxed cloud application 186. This sand boxed cloud application 186 may be configured to represent the actual, operational cloud application 184 including the dependencies to other applications/services. However, the sand boxed cloud application 186 may allow the monitoring service 180 to monitor without substantially impacting operations of the actual, operational cloud application 184.

The phrase "sand box" refers to a monitoring environment where the cloud application 186 may be monitored and/or tested separately from application 184. The separate environment may be implemented in a variety of ways including a separate directory and/or a separate virtual machine environment. Furthermore, the sand boxed application 186 may be implemented on the same or different physical machine (e.g., processor, memory, and/or the like) as the application 184. The dependent service or dependent application may thus represent an entity being called upon, accessed, or relied upon to provide information, and/or complete a function to allow the cloud-application 184 to provide is service or functionality.

In some implementations, the sand boxed cloud application 186 may represent a generic duplicate of the actual, operational cloud application 184. For example, the generic duplicate may be configured to primarily check whether the paths to each of the dependent service/applications are available. To illustrate further, the sand boxed cloud application 186 may check each of its dependencies with a ping or other request-response message to see if a path to the dependent application or service is in place.

Alternatively or additionally, the sand boxed cloud application 186 may represent a more customized representation of the actual cloud application 184. This customized duplicate 186 may include some of the functionality of the operational application 184 and thus check not only the paths to the dependent applications/services but also check the responses provided by the dependent applications/services to the application 186.

To illustrate further, cloud application 184 may correspond to a cloud-based leave or vacation processing application. When this is the case, user equipment 110 may include a user interface application 120 (e.g., SAP Fiori and/or other type of application) to access the cloud application 184 in order to process employee leave requests. This cloud application 184, as part of its function of processing vacation/leave requests, may access (e.g., call and/or the like) other applications and/or services. For example, the cloud application 184 may call or access dependent applications/services such as a message or mail service, a user interface service, a service providing database access to employee information, a service providing database access to employee payroll, and/or the like. Moreover, these dependent applications and/or services may be identified in configuration information for cloud application 184 as a path (e.g., a URL, and/or other type of address) and the identity of the target application or service (e.g., service type, service name, and/or the like). The configuration information may also include the identity of the cloud application, the current state of the execution of the cloud application, the current context (e.g., setting, input data, memory state, and/or the like) of the cloud application, and/or any other information that describes or represents the cloud application, its current state of execution, and/or the like.

Table 1 below depicts an example of configuration information identifying 4 paths, such as routes, for cloud application 184. If at least one of the paths is not available for any reason, the unavailable path represents an unavailable dependent service/application. These unavailable dependent applications/services may be provided to an application program interface at the cloud system 180 to enable presentation at user interface 122 for example. Returning to the leave processing example, if cloud application 184 cannot access a translation service, cloud application 184 may not be able to translate leave data into a format that can be understood by a reader of user interface 120, for example.

Table 2 depicts an additional example of configuration information. In the example of Table 2, the configuration information represents manifest information including the data sources used by the cloud application and/or any user interface dependencies. An unavailable or inaccessible data source may also be provided an application program interface at cloud system 180 to enable presentation at user interface 122 for example.

TABLE 1

```
{
    "routes": [{
        "path": "/webapp/resources",
        "target": {
            "type":      "service",
            "name":      "sapui5",
            "entryPath": "/resources"
        },
        "description":   "SAPUI5 Resources"
    }, {
        "path": "/translation",
        "target": {
```

TABLE 1-continued

```
        "type":         "destination",
        "name":         "translation"
    },
    "description":      "Translation Service"
}, {
    "path": "/services/userapi",
    "target": {
        "type":         "service",
        "name":         "userapi"
    },
    "description":      "Dispatcher user api"
}, {
    "path": "/sap/opu/odata",
    "target": {
        "type":         "destination",
        "name":         "dewdflhanaui5"
    },
    "description":      "dewdflhanaui5"
}],
"welcomeFile": "/webapp/test/flpSandbox.html",
"sendWelcomeFileRedirect": true
}
```

TABLE 2

```
{
    "_version": "1.2.0",
    "sap.app": {
        "_version": "1.2.0",
        "id": "${project.artifactId}",
        "type": "application",
        ...
        "dataSources": {
            "mainService": {
                "uri":
"/sap/opu/odata/iwbep/GWSAMPLE_BASIC/",
                "type": "OData",
                "settings": {
                    "odataVersion": "2.0",
                    "localUri":
"localService/metadata.xml"
                }
            }
        },
    ...
```

In some implementations, the sand boxed cloud application 186 may, as noted, represent a generic duplicate of the actual, operational cloud application 184. Referring again to the leave processing example above, the cloud application 186 may represent a more customized representation of the actual, operational cloud application 184. When this is the case, the monitoring service may also check the responses provided by for example the dependent services/applications (such as the translation service, employee leave database, and/or other dependent services/applications applications/services) to ensure that the responses are correct (e.g., the form, format, and/or content of the responses are correct). For example, the monitor plugins may perform predetermined test queries for their corresponding domain.

Figure 2:
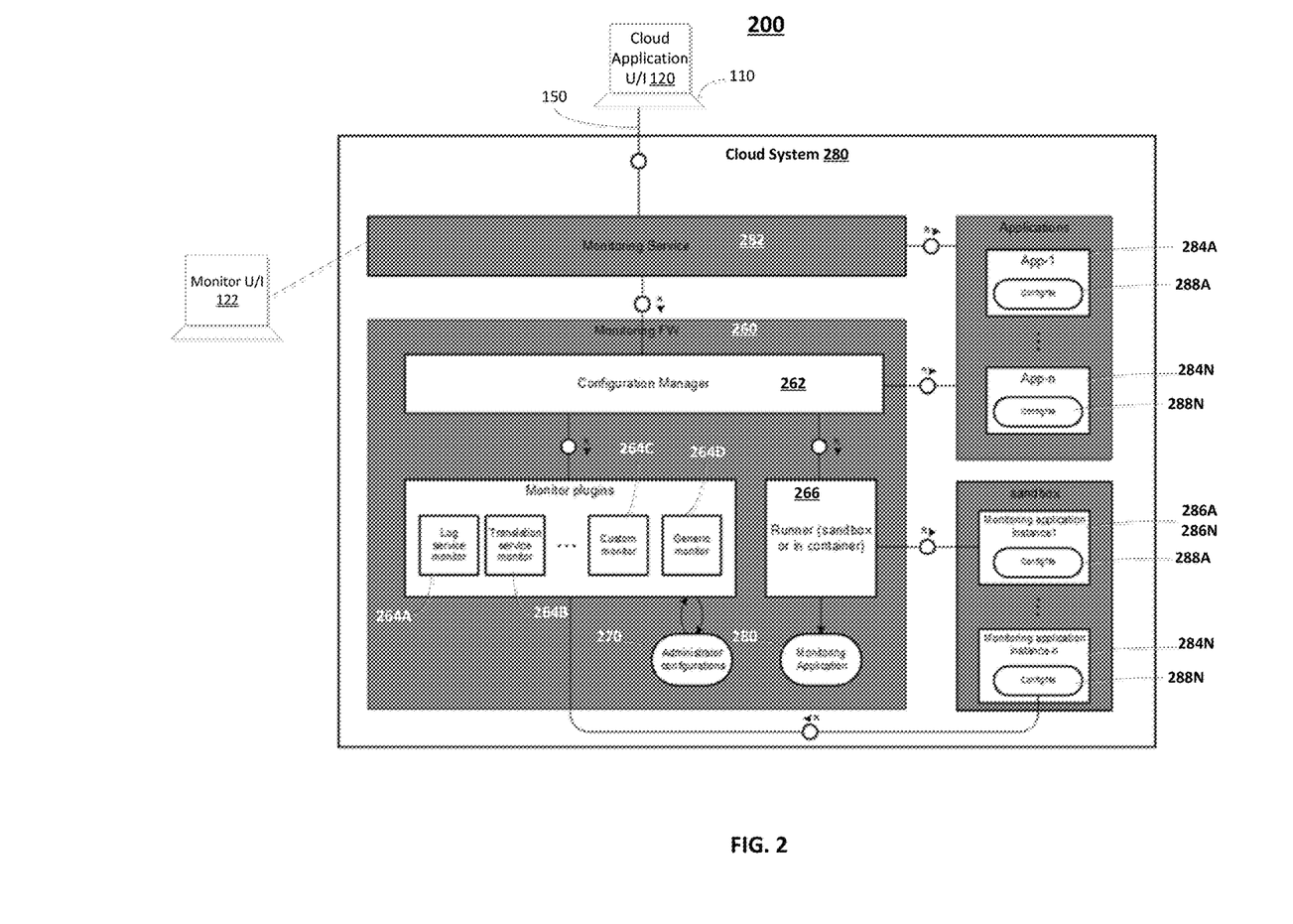
FIG. 2 illustrates a block diagram of another example of a cloud application monitoring service, in accordance with some example implementations.

FIG. 2 depicts another example of a system 200 including a cloud-based system 280. Cloud-based system 280 may be similar in some respects to cloud-based system 180 but includes some additional features as described further below.

The cloud-based system 280 may include at least one processor and at least one memory including code or instructions configured to cause one or more cloud-based application 284A-N to be provided. The cloud applications 184A-N may be accessed via the Internet 150 by one or more user equipment 110 including an interface 120.

The monitoring service 282 may expose application program interfaces that enable the configuration of the monitoring framework 260, enables monitoring cloud applications 184A-N, and/or enables the generation of user interface views (e.g., for presentation at user interface 122) presenting a list of the applications being monitored 284A-N, a list of the corresponding dependent applications/services for each of the applications 284A-N, an indication of the availability including status of the corresponding dependent applications/services, a description of the status, and/or the like.

The monitoring framework 260 may be configured to get metadata regarding the dependent application/services for each of the applications 284A-N being monitored by the service 282. The metadata may include, for each of the applications 284A-N, paths to the dependent data (as shown in for example Table 1), manifest information (as shown in Table 2 for example), dependency type such as application/service/etc., version, and/or the like.

The monitoring framework 260 may create the test versions 286A-N of the applications 284A-N. Test versions 286A-N may be created to allow monitoring the test versions, rather than the actual, operational applications 284A-N. When creating the test versions 286A-N, the monitoring framework 260 including the configuration manager 262 may configure the test versions 286A-N. For example, the obtained metadata from each of the test versions 286A-N may be used by the configuration manager 262 to create each of the test versions 286A-N. In the example of FIG. 2, test versions 286A is configured to emulate application 284A, while test version 286N is configured to emulate application 284N.

The monitoring framework 260 may create one or more application instances 286A-N and monitor the dependent applications/services. To create the test versions 286A-N, the configuration manager 262 may select from one or more plug-ins 264A-D. In the example of FIG. 2, the generic monitor plugin 264D may be configured to provide a test version that provides a basic check of the dependent applications (e.g., the actual functionality of the cloud-application would not be included in the generic plugin except for a basic ping check). This basic check may be to merely ping or send another message (which gets a response) to each of the paths (as determined from the metadata indicating the paths) to dependent applications/services.

FIG. 2 also shows a more customized plugin 264C. For example, if there is a specific dependent service, such as a messaging service, the configuration manager 262 may utilize the custom plugin 264C and configure it with metadata for the cloud application 284A to provide a more customized test version 286A. FIG. 2 also shows a log service and a translation service monitors 264A-B. These are some additional examples of dependent services that can be selected by the configuration manager 262 to provide a more customized test version 286A. The monitor plugins 264A-D may be mapped by the configuration manager 262 to a corresponding test version application 286A-N, which can then be consumed at runtime by the monitoring application instances 286A-N.

The configuration manager 262 may receive path(s) for each of the dependent applications/services and/or get application configurations files 288A-N from the applications 284A-N (or from another location). For example, the configuration manager 262 may obtain the metadata such as the configuration information and manifest information shown at Tables 1-2.

Once the application's 284A-N configuration information 288A-N is fetched, the configuration manager 262 may parse the configuration information and attempt to match each dependency with its appropriate monitor plugin. If a specific monitor is not found, the configuration manager 262 may, as a default, use the generic plugin 264D, which may simply monitor the dependency path. The configuration manager 262 may then indicate (or provide) the selected plugin to a runner component 266 to run a monitoring application instance 286A with the passed configurations, mappings, and/or plugins. The runner component 266 may be configured to receive as input an application configuration, receive a mapping to specific monitor plugins, and run an instance of a generic monitoring application (which may be run in a sand box) with the configuration, plugins, etc. Each monitor plugin may provide some logic as to which dependency they can be mapped to (e.g., by the dependency name, type, and version); and when the mapping cannot be done automatically, a default mapping may be used or an administrator may be prompted to provide a mapping.

In the example of FIG. 2, the application instance 286A may use generic application code (from generic plugin 264D) configured with specific configuration information 288A to simulate the dependencies of the monitored application 284A. The generic code routes each dependency to a specific instantiated test version 286A including a monitor plugin code for the actual monitoring. The monitoring results can be viewed by in the monitoring application user interface 122 or fetched from the monitoring application's API.

Figure 3:
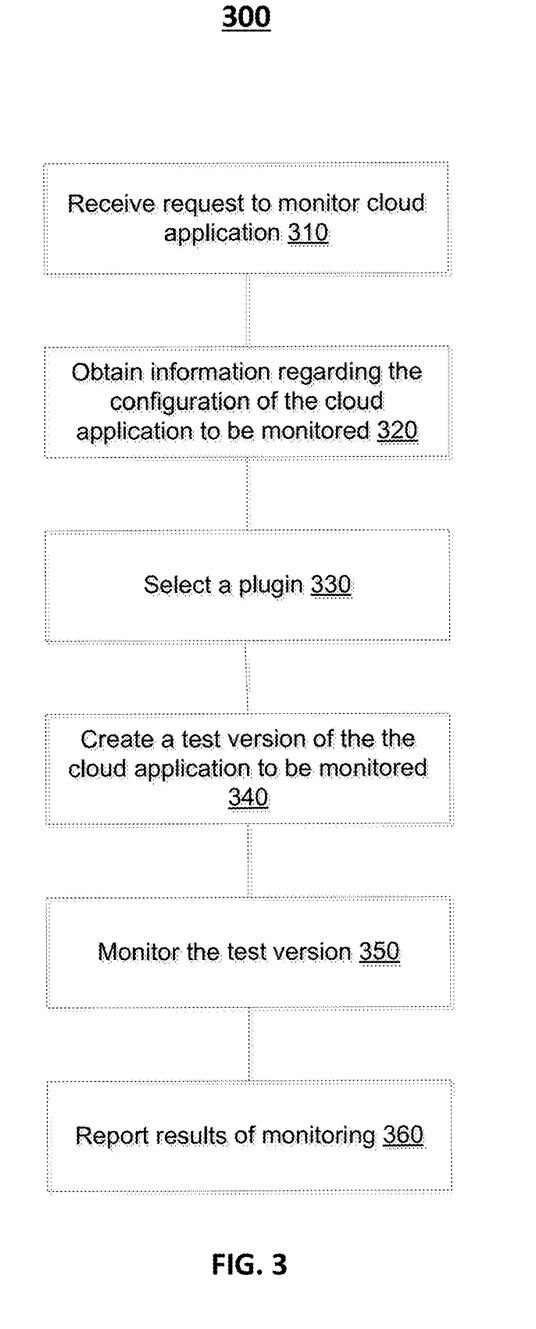
FIG. 3 depicts an example of a process for cloud application monitoring, in accordance with some example implementations.

FIG. 3 depicts an example of a process 300 for monitoring cloud applications, in accordance with some example implementations.

At 310, the cloud system may receive an indication to monitor a cloud application. The indication may represent a request from a client device 110 including user interface 120. Alternatively or additionally, the request may represent accessing an account at the cloud system where the cloud application can be accessed and used. Alternatively or additionally, the request may represent accessing a monitoring service account at the cloud system where the cloud application can be accessed and used. Alternatively or additionally, the request may occur automatically whenever an application having dependencies is used.

At 320, information regarding the cloud application to be monitored may be received. For example, the monitoring service may receive metadata representative of the cloud application to be monitored. This metadata may include the identity of the cloud application to be monitored, path information indicative of the paths to the services or applications that it calls, access, or relies upon, types, versions, and/or other information regarding the state or context of the cloud application to be monitored. The metadata may be obtained directly from the cloud application to be monitored as well as other sources.

At 330, a plugin may be selected. For example, the monitoring service may select one or more plugins from the plurality of plugins. To illustrate, the monitoring service 282 may select, based on the information obtained at 320, generic plugin 264 that checks the paths to dependent services/applications.

At 340, a test version of the cloud application may be created. For example, the monitoring service may, based on the plugin and information received at 320, create (or initiate the creation of) a test version, such as sand boxed application 286A. This sand boxed application 286A may then be configured to check the dependent services/applications.

At 350, the test version may be monitored. For example, the monitoring service may monitor the test version 286A rather than monitor the operational cloud application 284A itself. When the generic plug in is used to create the sand boxed application 286A, the monitoring service may monitor sand boxed application 286A. Any checks that fail (e.g., if a path to a dependent application is not available may be reported to the monitoring service, so that monitoring service can report, at 360, the failure via for example an API and user interface 122, for example.

One or more aspects of process 300 may be repeated from time to time to check the availability of the dependent services/applications.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Although there are slight differences between a service and an application, the terms are used interchangeably herein unless noted otherwise. The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
    receiving an indication to monitor a cloud application;
    obtaining metadata regarding the cloud application, the metadata comprising at least one path to at least one dependent service;
    determining, from the metadata, an identity of the cloud application;
    checking, based on the identity of the cloud application, whether a predetermined plugin is mapped to the identity;
    selecting, based on the obtained metadata, a plugin configured to monitor the at least one dependent service, wherein the selecting further comprises:
        selecting, as the plugin, the predetermined plugin when there is a mapping between the identity and the predetermined plugin; and
        selecting, as the plugin, a default plugin that checks the at least one path when there is no mapping between the identity and the predetermined plugin;
    causing, based on the selected plugin and the obtained metadata, the creation of a test application configured to monitor the at least one dependent service, wherein the test application is created in a sand box separate from the cloud application; and
    providing to a user interface an indication regarding a status of the monitored at least one dependent service.

2. The method of claim 1, wherein the indication to monitor represents a request from a user interface to monitor the cloud application.

3. The method of claim 1, wherein the metadata includes configuration information representative of a state of the cloud application.

4. The method of claim 1, wherein the plugin is further configured to at least check a response message from the at least one dependent service to ensure that the response message includes a proper format and/or a proper content.

5. The method of claim 4, wherein the plugin sends a predetermined message to trigger the response message.

6. The method of claim 1, wherein the plugin is selected from a plurality of plugins.

7. The method of claim 1 further comprising:
    monitoring the test application, rather than the cloud application, to check the availability of the at least one dependent service.

8. The method of claim 1, wherein the selected plugin is a generic plugin configured to monitor the at least one path to the at least one dependent service by at least sending at least one message to check the availability of the at least one path.

9. A system comprising:
    at least one processor;
    at least one memory including program code which when executed causes operations comprising:
        receiving an indication to monitor a cloud application;
        obtaining metadata regarding the cloud application, the metadata comprising at least one path to at least one dependent service;
        determining, from the metadata, an identity of the cloud application;
        checking, based on the identity of the cloud application, whether a predetermined plugin is mapped to the identity;
        selecting, based on the obtained metadata, a plugin configured to monitor the at least one dependent service, wherein the selecting further comprises:
            selecting, as the plugin, the predetermined plugin when there is a mapping between the identity and the predetermined plugin; and
            selecting, as the plugin, a default plugin that checks the at least one path when there is no mapping between the identity and the predetermined plugin;
        causing, based on the selected plugin and the obtained metadata, the creation of a test application configured to monitor the at least one dependent service, wherein the test application is created in a sand box separate from the cloud application; and
        providing to a user interface an indication regarding a status of the monitored at least one dependent service.

10. The system of claim 9, wherein the indication to monitor represents a request from a user interface to monitor the cloud application.

11. The system of claim 9, wherein the metadata includes configuration information representative of a state of the cloud application.

12. The system of claim 9, wherein the plugin is further configured to at least check a response message from the at least one dependent service to ensure that the response message includes a proper format and/or a proper content.

13. The system of claim 12, wherein the plugin sends a predetermined message to trigger the response message.

14. The system of claim 9, wherein the plugin is selected from a plurality of plugins.

15. The system of claim 9, further comprising:
    monitoring the test application, rather than the cloud application, to check the availability of the at least one dependent service.

16. A non-transitory computer-readable storage medium including program code which when executed by at least one processor causes operations comprising:

receiving an indication to monitor a cloud application;
obtaining metadata regarding the cloud application, the metadata comprising at least one path to at least one dependent service;
determining, from the metadata, an identity of the cloud application;
checking, based on the identity of the cloud application, whether a predetermined plugin is mapped to the identity;
selecting, based on the obtained metadata, a plugin configured to monitor the at least one dependent service, wherein the selecting further comprises:
   selecting, as the plugin, the predetermined plugin when there is a mapping between the identity and the predetermined plugin; and
   selecting, as the plugin, a default plugin that checks the at least one path when there is no mapping between the identity and the predetermined plugin;
causing, based on the selected plugin and the obtained metadata, the creation of a test application configured to monitor the at least one dependent service, wherein the test application is created in a sand box separate from the cloud application; and
providing to a user interface an indication regarding a status of the monitored at least one dependent service.

* * * * *